United States Patent [19]

Nagashima et al.

[11] 3,933,664

[45] *Jan. 20, 1976

[54] ORGANIC PHOTOCONDUCTIVE TONER MATERIALS

[75] Inventors: Shinichiro Nagashima; Kaichi Tsuchiya, both of Tokyo, Japan

[73] Assignee: Canon Inc., Tokyo, Japan

[ * ] Notice: The portion of the term of this patent subsequent to Oct. 29, 1991, has been disclaimed.

[22] Filed: Nov. 6, 1974

[21] Appl. No.: 521,372

Related U.S. Application Data

[62] Division of Ser. No. 314,519, Dec. 13, 1972, Pat. No. 3,852,208, which is a division of Ser. No. 888,886, Dec. 29, 1969, Pat. No. 3,721,554.

[30] Foreign Application Priority Data

Dec. 30, 1968  Japan................................. 43-96404
May 12, 1969  Japan................................. 44-36431

[52] U.S. Cl................. 252/62.1; 96/1 PE; 96/1.2; 96/1.5; 96/1.6; 96/1.3; 8/1 E; 8/2
[51] Int. Cl.$^2$...................... G03G 9/00; G03G 9/02
[58] Field of Search............... 96/1 PE, 1.2, 1.5, 1.6; 252/62.1

[56] References Cited
UNITED STATES PATENTS

| | | | |
|---|---|---|---|
| 2,671,786 | 3/1954 | Scalera et al. | 260/249 |
| 2,986,521 | 5/1961 | Wielicki | 96/1.2 X |
| 3,060,180 | 10/1962 | Staenble et al. | 260/249 |
| 3,261,826 | 7/1966 | Moren | 260/153 C |
| 3,560,360 | 2/1971 | Carreira | 96/1 PE |
| 3,577,444 | 5/1971 | Clecak et al. | 96/1.5 X |
| 3,681,107 | 8/1972 | Moriconi et al. | 252/62.1 X |
| 3,730,711 | 5/1973 | Ono et al. | 96/1.6 X |
| 3,844,781 | 10/1974 | Tscuhiya | 96/1.5 |
| 3,852,208 | 12/1974 | Nagashira et al. | 96/1.5 X |

*Primary Examiner*—Roland E. Martin, Jr.
*Attorney, Agent, or Firm*—Toren, McGeady and Stanger

[57] ABSTRACT

A light-transparent photoconductive material for use in electrophotography is the reaction product obtained by condensing
 a. an organic photoconductive compound containing an amino and/or hydroxyl group and
 b. a reactive colored compound containing an active halogen atom;

or by condensing
 a. an organic photoconductive compound containing an active halogen atom and
 b. a reactive colored compound containing an amino and/or hydroxyl group.

3 Claims, No Drawings

ORGANIC PHOTOCONDUCTIVE TONER MATERIALS

This is a division of application Ser. No. 314,519 filed Dec. 13, 1972, now U.S. Pat. No. 3,852,208, which in turn was a division of application Ser. No. 888,886 filed on Dec. 29, 1969, now U.S. Pat. No. 3,721,554.

FIELD OF INVENTION

The present invention relates to novel colored or color developing organic photoconductive materials which are useful as developing or photosensitive materials in electrophotography or related techniques.

BACKGROUND INFORMATION AND PRIOR ART

A variety of substances have previously been proposed as organic photoconductive materials to be used in electrophotography, such as, for example, N-vinylcarbazole and its derivatives. However, very few colored or color developing organic photoconductive materials are known which are obtained by coupling organic photodonductive materials with coloring materials or color developing components.

The present inventors, who have investigated the reproduction of multi-colored or naturally colored images as one of the aims in electrophotography, obtained good results when they used colored organic photoconductive materials as toner in the production of superimposed images.

In this case, if the images toned in cyan color are electrically insulating, they are also charged at the second negative charging and the charged electricity will not disappear at the following exposure to green light so that the images produced by the magenta toner inevitably overlap the images in cyan. On the other hand, however, if the cyan-colored toner is electrically conducting, the cyan images are not at all charged during the second charging process so that, if the images produced by the second exposure with the green light overlap the blue images of the first exposure, the magenta toner will never be attached to the respective part. To overcome the difficulty, the toner has to exhibit photosensitivity in itself.

For obtaining satisfactory results it is, however, not sufficient that the toner possesses photosensitivity or photoconductivity. If the magenta toner and the yellow toner are not transparent to light, for example, the parts where the images of three colors superimpose each other will not show their mixed color (in other words, will not show blue color at the superimposition of cyan and magenta, nor green color at the superimposition of cyan and yellow), but the color of the toner employed afterwards covers the color of the previously applied toner, so that the parts where cyan is superimposed by magenta and by yellow show magenta and yellow color, respectively.

In conclusion, the toners, in either dry or wet process of developing, must be of colored materials having photoconductivity and light transparency to reproduce naturally colored images by electrophotography.

Organic photoconductive materials colored with a coloring material and meeting the above requirements have previously been investigated. But the lot-to-lot variation of the coloring materials with respect to purity, solubility etc. often resulted in fluctuation in the quality of product, and therefore reproducible and continuous production of the developers was very difficult. It was also found that the coloring materials in the developed images became blurred during storage and have a tendency to transfer to other matter.

The present inventors continued their efforts to eliminate these defects and finally arrived at the present invention.

SUMMARY OF INVENTION

The object of this invention is to provide colored or color developing organic photoconductive materials which are transparent to light.

An other object of this invention is to provide colored or color developing organic photoconductive materials and which can be reproducibly produced with constant color characteristics and which are not influenced by lot-to-lot variation of the contamination of impurities.

A further object of this invention is to provide colored or color developing organic photoconductive materials for use in photographic developing having favorable light transparency of which the electrical characteristics are suited especially to the reproduction of multi-colored or naturally colored images.

A further object of this invention is to provide a process for producing visible images by employing color developing organic photoconductive materials as materials for photographic developing and making them to react with a color developing auxiliary after the developing process.

An other further object of this invention is to provide colored or color developing photosensitive materials for use in electrophotography which have a photosensitive layer containing colored or color developing organic photoconductive materials.

The present invention can provide colored organic photoconductive materials for use in electrophotography by the reaction of organic photoconductive substances with reactive colored components. The reactive colored components refer to reactive coloring materials and reactive color developing components in general.

In other words, the present invention relates to a procedure for obtaining colored organic photoconductive materials for use in electrophotography by the reaction of organic photoconductive materials with reactive coloring materials, and also to a process for obtaining color developing organic photoconductive materials for use in electrophotography by the reaction of organic photoconductive substances with reactive color developing components.

The colored or color developing organic photoconductive materials of this invention can be obtained by chemically combining an organic photoconductive substance having at least one amino or hydroxy group with a coloring or a color developing component having at least one active halogen atom.

Further the colored or color developing organic photoconductive materials of this invention can be obtained by chemically combining an organic photoconductive substance having at least one active halogen atom with a coloring or a color developing component having at least one amino or hydroxyl group.

The resulting products of the chemical combination are not only photoconductive but also colored and light-transparent, and the colors on them are free from defects, e.g., they do not become blurred or transferred because the coloring materials are chemically combined, not in the same manner as in a usual dyeing, with the photoconductive substances, and the steadiness of color was maintained for every product owing to the constant ratio of combining molecules in the chemical combination.

When the color developing organic photoconductive materials of this invention are employed as materials for photographic developing, they can either be reacted beforehand with a color developing auxiliary to develop coloration, or they are used as they are as materials for developing and are reacted, after developed, with the color developing auxiliary to develop coloration.

The colored or color developing organic photoconductive materials may be pulverized in a ball-mill, a roll-mill and an atomizer to use them as toner for use as dry or wet developing agent, or they may be used in combination with other colored substances or vehicle resins, in the case of which the vehicle resins include, for example, rosin and the derivatives thereof, styrene resin, alkyd resin, terpene resin, xylene resin, straight chain hydrocarbon resin, phenol resin, epoxy resin and acrylic resin. These toners may be used as developer for negatively charged images in single or in combination with carrier materials such as glass beads, iron powder and furs.

When the organic photoconductive materials are used as wet developing agent, the materials are dispersed in a carrier liquid. For the carrier liquid, an insulating liquid widely known as carrier liquid for a liquid developer, for example, aliphatic hydrocarbons, cycloaliphatic hydrocarbons, halogenated hydrocarbons, aromatic hydrocarbons such as pentane, hexane, gasoline, kerosene, mineral spirit, cyclohexane, carbon tetrachloride, perchloroethylene and naphtha and silicone oil waxes may be used and in a special case water may be used.

When the colored or color developing organic photoconductive materials of this invention are utilized as the photosensitive materials for use in electrophotography, a binding resin or plasticizer is not required for the organic photoconductive materials having capability of forming films, but use of 30 – 100% by weight of a binding resin is desired for the photoconductive materials which do not have capability of forming films. In this case, a plasticizer may be added in the amount of 5 – 100% by weight, alone or in combination with an other photoconductive material, to further improve the quality of the coating films.

Binding resins referred to above include, for example, polystyrene resin, polyvinyl chloride, phenol resin, polyvinyl acetate, polyvinyl acetal, epoxy resin, xylene resin, alkyd resin, polycarbonate resin, acrylonitrile styrene resin.

As supports for the photosensitive materials may be used, for example, metallic plates of aluminum copper, zinc and silver, papers treated so that solvents could not enter the interior, aluminum laminated paper, films of synthetic resins in which a plasticizer is contained, and supports the surfaces of which are coated with a metal, a metal oxide or a metal halide as glass, paper, polyethylene, polypropylene, polyethylene terephthalate, polystyrol, polyvinyl chloride, ethylcellulose, cellulose acetate, polyester films and other synthetic resin films. In general, they should have a surface resistance less than $10^9$ ohms, preferably less than $10^5$ ohms.

The films of the photosensitive layer can be formed on the supports in a conventional manner such as, for example, by use of rolls, wire bars, or air knives.

Since the color developing organic photoconductive materials of this invention are generally colorless or lightly colored, they have many advantages over colored organic photoconductive materials when employed as materials for photographic developing or photosensitive materials.

The most predominant advantages of the materials of this invention as used for materials of photographic developing is as follows. In case of developing by way of superimposed multi-colored images as described before, for example, if an already colored material for developing is used, the coloration of the first developed image will act as filter in the subsequent exposures, thus significantly decreasing the apparent sensitivity to decrease. However, if a color developing organic photoconductive material which is colorless or lightly colored is used, the above described difficulty will be completely eliminated or at least minimized.

When these colorless or lightly colored materials are used for photosensitive materials, unfavorable effects on sensitivity to light and color could not be observed.

On the other hand, in synthesizing photoconductive materials, the reaction of a colored substance with an organic photoconductive compound should be carried out fairly slowly in order that the coloring substance be not decomposed nor faded in the course of reaction. The various conditions of reaction may, however, be freely selected, when a color developing component is used, because the component is usually of a lower molecular weight and more resistant to heat and light than the coloring substances.

The condensation reaction of the various active halogens and amines of this invention is preferably performed in anhydrous media. The condensation reactions under such condition generally proceed at an amazingly high rate at the boiling point of ordinary organic solvents such as, for example, benzene, toluene, xylene, monochlorobenzene, dichlorobenzene, trichlorobenzene, nitrobenzene and dioxane. Further, to accelerate the reactions in general, an acid condensing agent (for example, pyridine, triethylamine, anhydrous sodium acetate, etc.) is added with advantage.

Organic photoconductive compounds having an amino or a hydroxyl group or groups which may be employed in the present invention include, for example, the following:

(1) 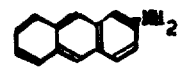

(2) 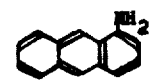

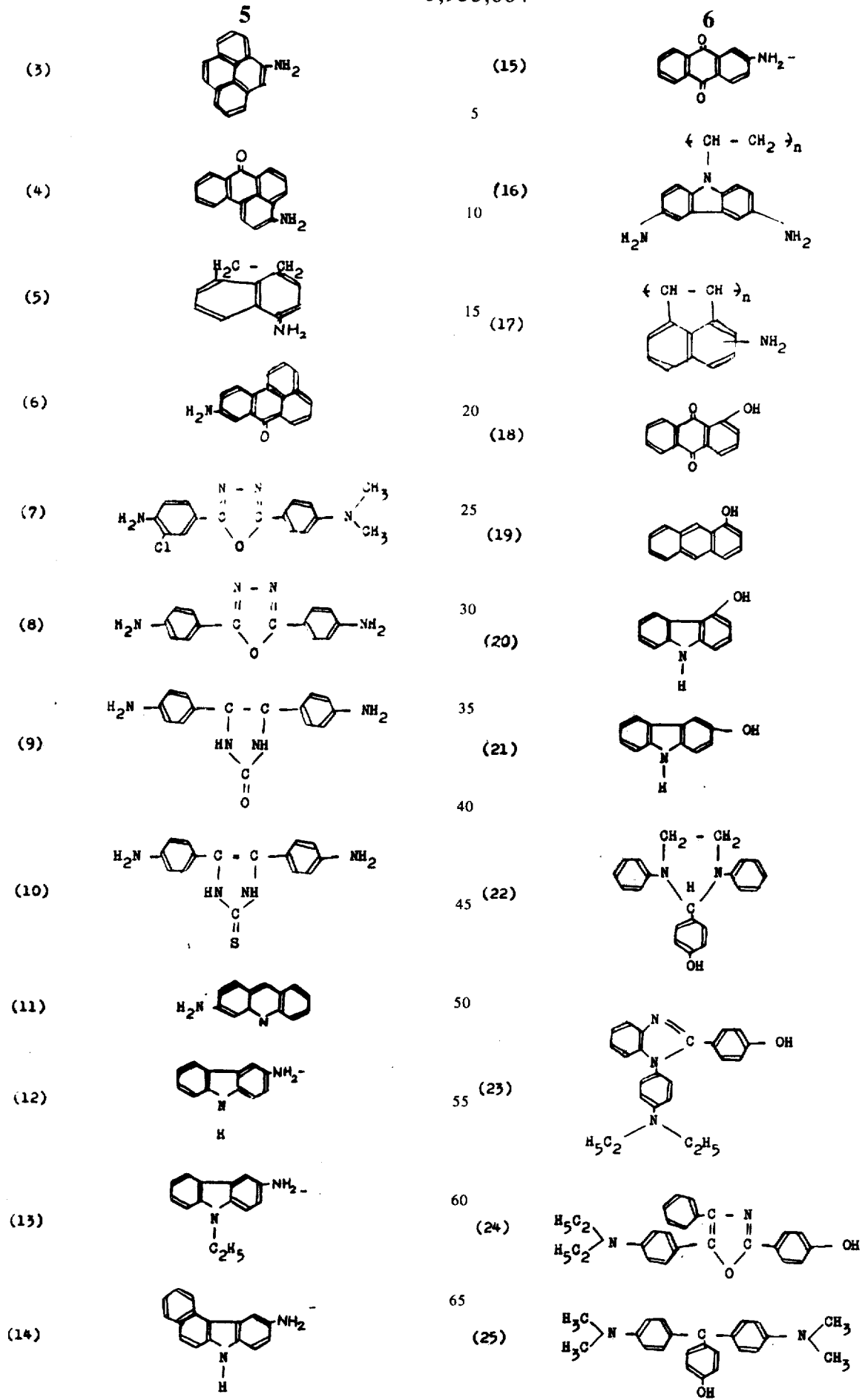

(26) 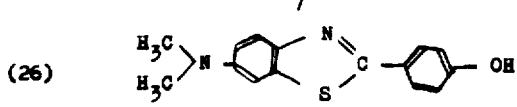
The photoconductive substances having an active halogen atom or atoms include, for example, following substances:
(27) 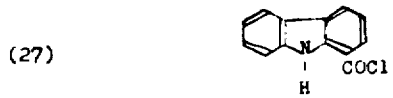
(28) 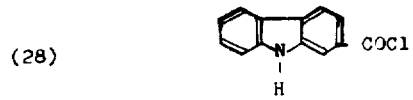
(29) 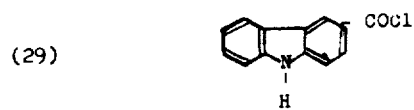
(30) 
(31) 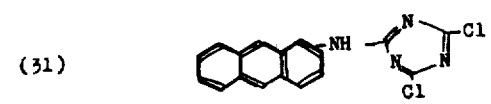
(32) 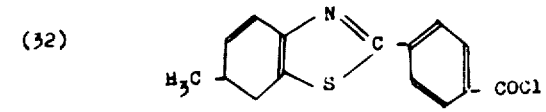
(33) 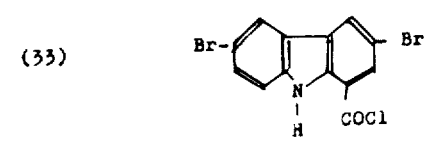
(34) 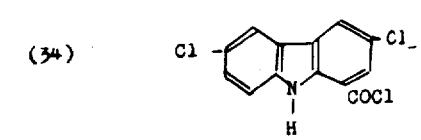
The reactive coloring materials or compounds having an active halogen atom or atoms, which may be employed in the present invention, include the following substances:
(35) 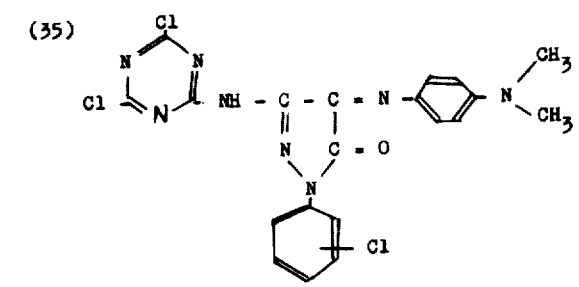
(36) 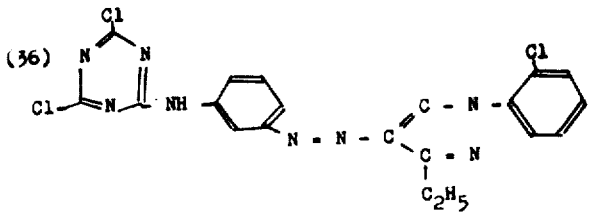
(37) 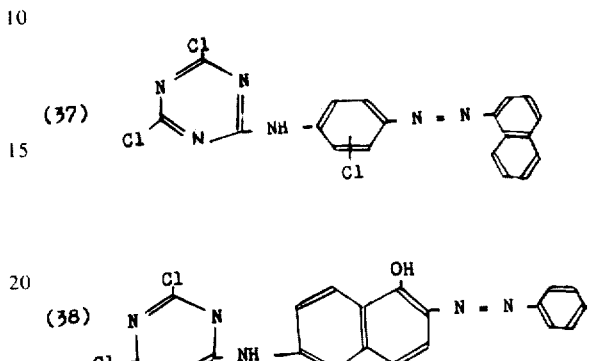
(38) 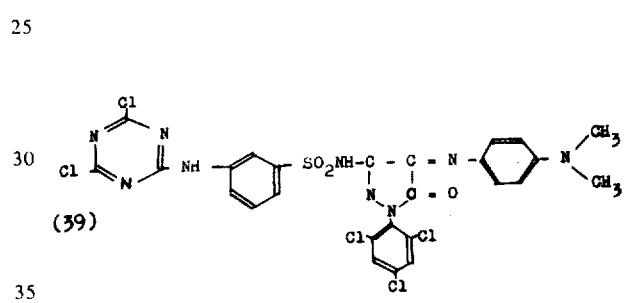
(39) 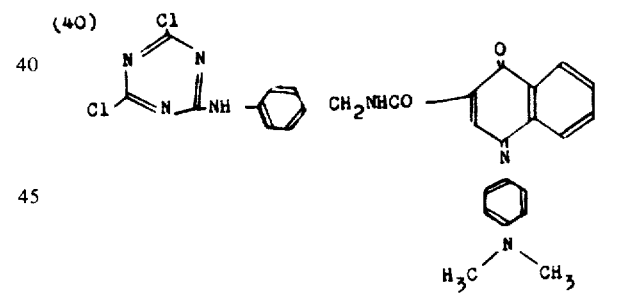
(40) 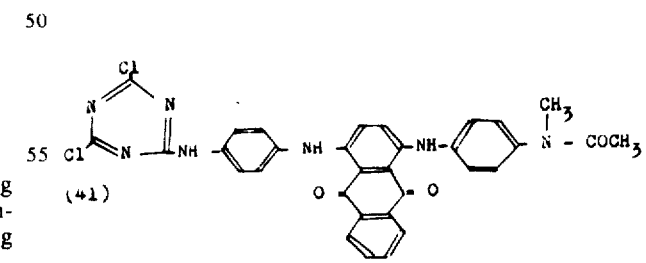
(41) 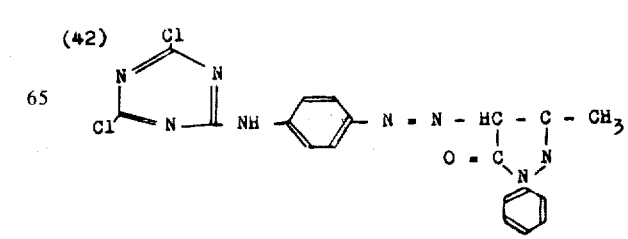
(42) 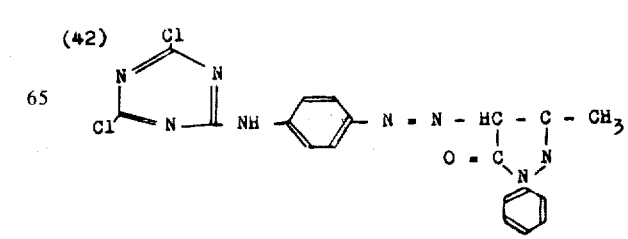

(43) 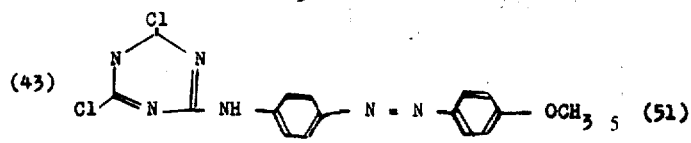
(44) 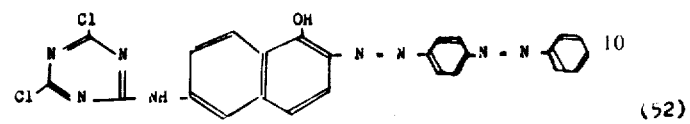
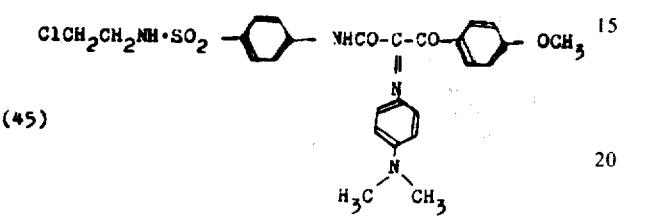
(45)
(46) 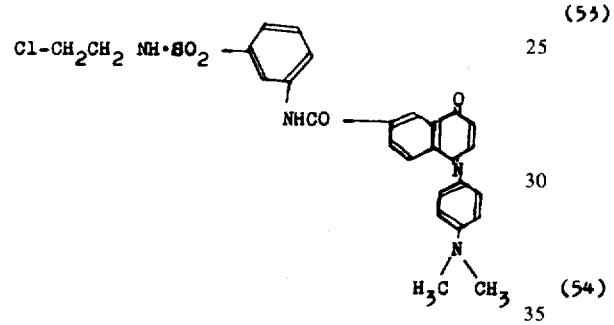
(47) 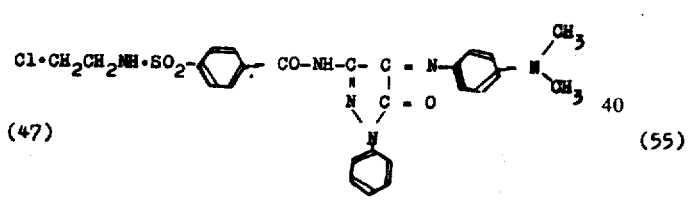
(48) 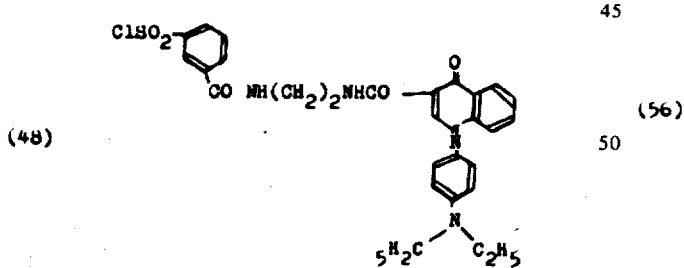
(49) 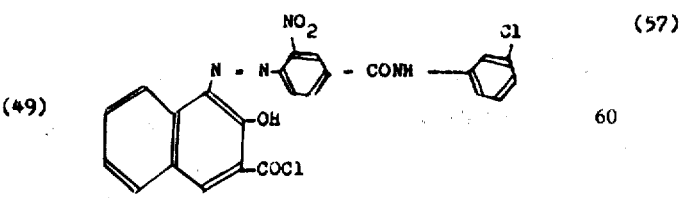
(50) 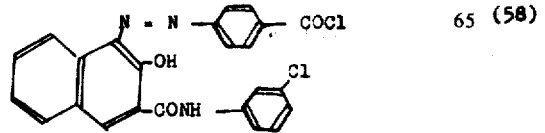
(51) 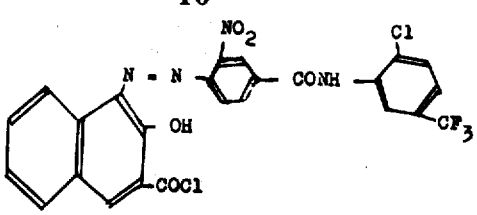
(52) 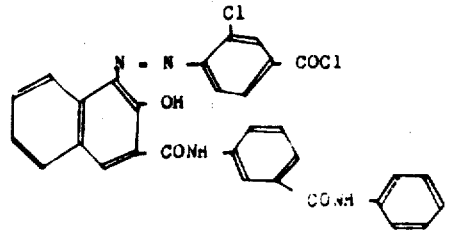
(53) 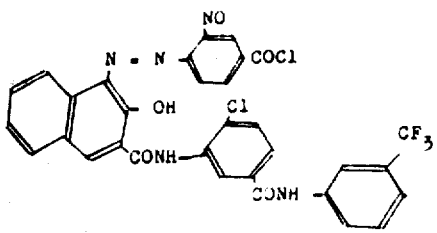
(54) 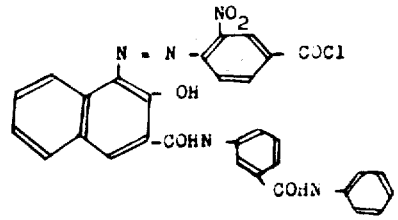
(55) 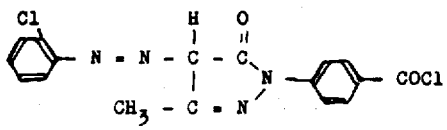
(56) 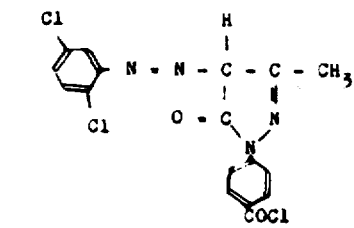
(57) 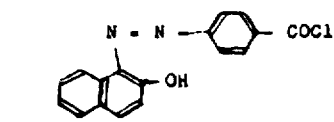
(58) 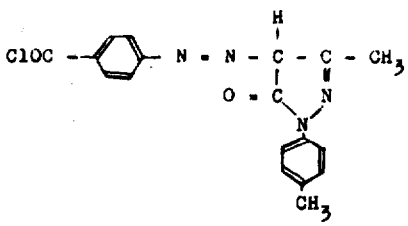

The reactive coloring materials having an amino or a hydroxy group or groups include, for example, the following:
(59) 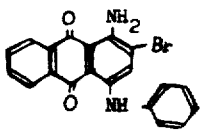
(60) 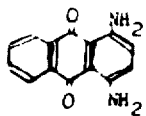
(61) 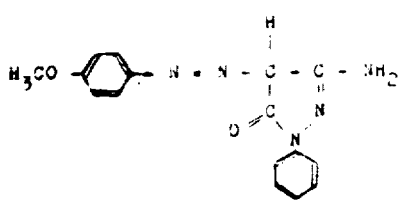
(62) 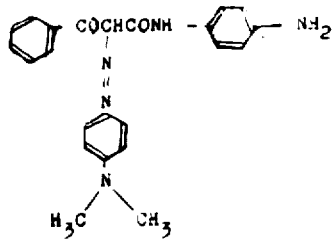
(63) 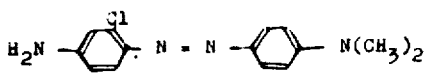
(64) 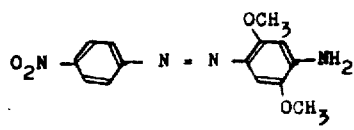
(65) 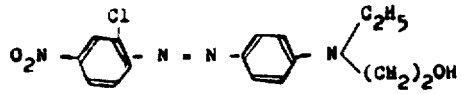
(66) 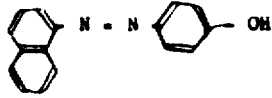
(67) 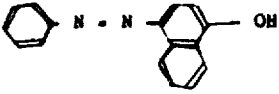
(68) 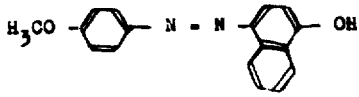
(69) 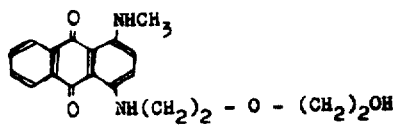
(70) 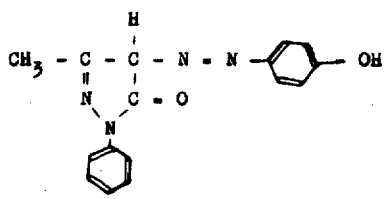
(71) 
Examples of reactive color developing components having an active halogen atom or atoms, which are employed in the present invention include, for example, the following substances:
(72) 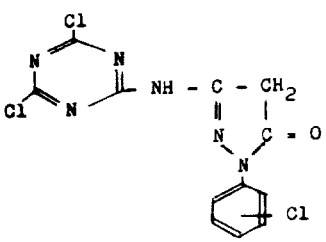
(73) 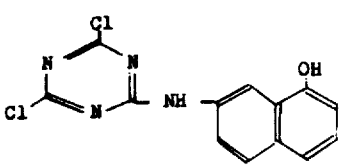
(74) 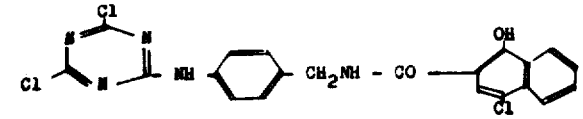
(75) 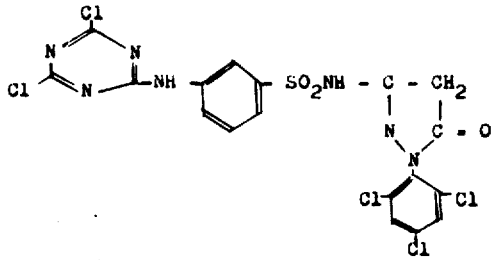
(76) 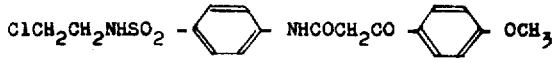
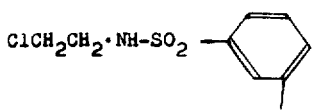
(77) 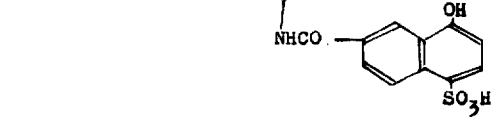

(78) 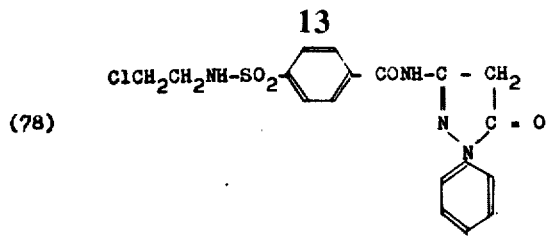

(79) 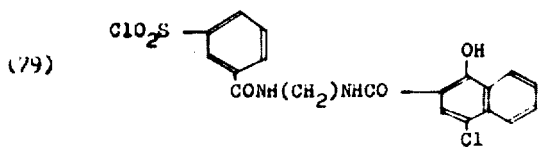

The reactive color developing components having an amino or/and a hydroxyl group which are employed in the present invention include, for example, the following substances:

(80) 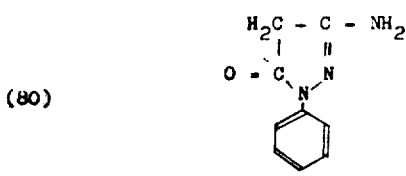

(81) 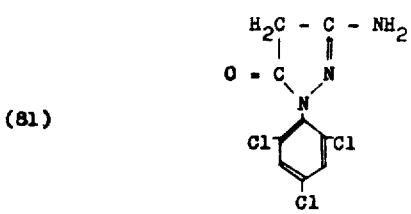

(82) 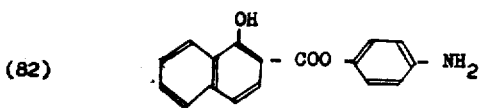

(83) 

(84) 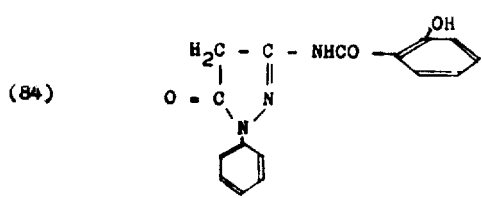

(85) 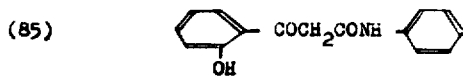

The present invention will be illustrated below with reference to examples, but these examples do not restrict the invention.

Examples of reactions of reactive coloring materials having an active halogen atom or atoms with organic photoconductive substances having an amino or hydroxyl group or groups.

EXAMPLE 1

The substance (1.0 mol) of the formula (1) was dissolved in 3 liters of dried dioxane to which then 700ml of dried was added, and the solution was thoroughly mixed by stirring and kept at 0° – 5°C. Next, the reactive coloring material (0.6 mol) of the formula (35) was dissolved in 3.0 liters of dried dioxane, which was added in small increments to the above solution in such a manner that the temperature did not rise above 5°C. After the whole volume had been added, the resultant solution was stirred for 30 minutes, and to it a solution of 1.0 mol sodium carbonate in 500ml water was added at the same temperature. After stirred for 3.5 – 4 hours, the mixture was poured into a large amount of water to obtain a magenta-colored photoconductive coloring material. Recrystallization from dioxane gave magenta-colored crystals. Melting point: 245° – 248°C.

EXAMPLE 2

The substance (1.0 mol) of the formula (4) was dissolved in 3 liters of dried dioxane to which 700ml of dried acetone was added. The mixed solution was thoroughly mixed by stirring and kept at 0° – 5°C. Using a solution in which 0.5 mol of the substance of the formula (36) was dissolved in 3.0 liters of dried dioxane, the same treatment as in Example 1 was followed to obtain a solid yellow substance.

EXAMPLE 3

The substance (1.0 mol) of the formula (5) was dissolved in 3 liters of dried dioxane to which 700ml of dried acetone was added. The mixed solution was thoroughly mixed by stirring and kept at 0° – 5°C. The substance (0.5 mol) of the formula (41) was dissolved in 3.0 liters of dioxane. Using the solutions, the same treatment as in Example 1 was followed to obtain a solid blue substance.

EXAMPLE 4

The substance (1.0 mol) of the formula (7) was dissolved in a mixture of 3 liters of dried dioxane and 4 mol of triethylamine. On the other hand, the substance (1 mol) of the formula (49) was dissolved in 4.0 liters of o-dichlorobenzene. Using these solutions, the same treatment as in Example 1 was followed to obtain solid reddish orange matter.

EXAMPLE 5

The substance (1.0 mol) of the formula (11) was dissolved in 3 liters of dried dioxane to which 700ml of dried acetone was added. The solution was thoroughly mixed by stirring and kept at 0° – 5°C. Next, the substance (0.5 mol) of the formula (43) was dissolved in 3.0 liters of dried dioxane. Using these solutions, the same treatment as in Example 1 was followed to obtain a solid yellow substance.

EXAMPLE 6

The substance (1.0 mol) of the formula (21) was dissolved in 3 liters of monochlorobenzene to which 300g of triethylamine was added. A solution of 1.0 mol substance of the formula (49) in 2.5 liters of dioxane was added to the above solution at 0° – 5°C. An exothermic reaction took place. After the whole volume of the solution had been mixed, the temperature was maintained at 90° – 95°C and the stirring was continued for 90 minutes to complete the reaction. After being cooled, the mixture was filtered and the filtrate was evaporated to the half volume under reduced pressure. The remainder was added to methyl alcohol to obtain a red photoconductive substance. Recrystallization from a mixture of monochlorobenzene and dioxane gave a red photoconductive substance (m.p. 200°C).

EXAMPLE 7

The substance (1.0 mol) of the formula (26) was dissolved in 4.0 liters of dioxane to which 320g of triethylamine was added. The mixture was cooled to 0°-5°C under agitation. On the other hand, the substance (1.0 mol) of the formula (58) was dissolved in 4.5 liters of dioxane. Using these solutions, the same treatment as in Example 6 was followed to obtain a yellowish red organic photoconductive substance.

Examples of reactions of an organic photoconductive substance having an active halogen atom or atoms with a reactive coloring material having an amino or a hydroxyl group of groups.

EXAMPLE 8

The substance (1.0 mol) of the formula (59) was dissolved in a mixture of 3.0 liters of monochlorobenzene and 4.0 liters of pyridine. While the solution being stirred at 0° - 5°C, 1.0 mol of the substance of the formula (27) was added. Then the stirring was continued at the elevated temperature 90° - 95°C for 90 minutes to complete the reaction. The whole mixture was then poured into iced hydrochloric acid when a purple solid was separated. After separated by filtration, the solid matter was washed thoroughly with water and dried. Recrystallization from monochlorobenzene gave violet photoconductive powders with the yield 62 - 65%.

EXAMPLE 9

The substance (1.0 mol) of the formula (34) was dissolved in 3 liters of dried dioxane to which 700ml of dried acetone was added. The solution was thoroughly mixed by stirring and kept at 0° - 5°C. On the other hand, the substance (1.0 mol) of the formula (61) was dissolved in 3.0 liters of dioxane. Using these solutions, the same treatment as in Example 1 was followed to obtain an orange photoconductive substance.

EXAMPLE 10

The substance (1.0 mol) of the formula (65) was dissolved in a mixture of 2.5 liters of dioxane and 2.0 liters of monochlorobenzene, to which 300g of triethylamine was added. The solution was kept at 0° - 5°C. The substance (1.0 mol) of the formula (33) was added to the above solution and the same treatment as in Example 8 was followed to obtain an oragne photoconductive matter with the yield 72%.

EXAMPLE 11

The substance (1.0 mol) of the formula (34) was reacted with the substance (1.0 mol) of the formula (67) in the same manner as in Example 10 to obtain an orange photoconductive substance.

Examples will be shown below in which the colored organic photoconductive materials of the present invention are used as developing materials for electrophotography.

EXAMPLE 12

The chemically bound colored substances described in Examples 1 through 11 were pulverized into powders of $5\mu$ diameter in average with an atomizer and 1 - 10g, preferably 2 - 5g, of the powders were mixed thoroughly with 100g of magnetic iron powders (as carrier) of 100 - 150 mesh in the average diameter of particles. The mixture was adsorbed on a bar magnet to be used as a magnetic brush, with which several time scanning on electrostatic figures produced visible images. The images, when treated by the known process of fixation, were converted into permanent ones.

EXAMPLE 13

The chemically bound colored substances (10g) described in Examples 1 through 11 were dispersed with a ball mill in 100ml of insulating liquid such as herosene and mineral spirit, and 10ml of it was again dispersed in the same manner in 2 liters of an insulating liquid to obtain a liquid photographic developer. Use of the liquid to develop electrostatic figures on a photosensitive paper for electrophotography produces visible figures, when applied in an appropriate manner such as dipping, rolling or spraying.

EXAMPLE 14

A photosensitive paper for electrophotography prepared by use of zinc oxide and acrylic resin was charged with a corona discharger with the applied voltage $-7KV$. Then the paper was exposed to a colored figure through a red filter. The electric charge remains on the paper only in the shape of figure which should be colored in blue. The charged figure was developed with the developer for blue color (the liquid photographic developer obtained in Example 3 prepared by adding 1.5 - 2.0g of a blue substance in 100ml of a petroleum solvent and by dispersing with a ball mill for 15 - 20 hours) and was fixed. After being dried, the paper was again charged with electricity, exposed to a colored figure through a green filter and developed with a developer for magenta color (prepared in the same manner as above using the toner obtained in Example 1), by which process the only part that was sensitive to the magenta developer appeared in color by the developing. After the figure was fixed, the paper was again electrostatically charged, exposed through a blue filter and developed in the same manner (with a similar developer using the toner prepared in Example 2), by which process the only part that was sensitive to the photographic developer for yellow color appeared. The composite figure thus obtained almost perfectly reproduced the original figure.

The colored organic photoconductive materials of this invention is employed not only as a toner as above in both wet and dry processes, but also as a suitable developing material to be used for the photoelectrophoretic imaging process. This process employs photoconductive pigment as toner in place of a so-called light sensitive layer made of a photoconductor.

The following example illustrates the case in which the colored organic photoconductive materials of this invention was employed as developer for figure formation in the photoelectrophoretic imaging process.

EXAMPLE 15

To a petroleum solvent Isopar-H (commercial name) 12 - 15% by weight of the substance obtained in Example 1 was added and the mixture was treated with a ball mill for 4 – 5 days to make a dispersoid of micro particles. This was applied on a light transparent electrode in a thin layer on which was placed an insulating paper and further on it another electrode. While a DC voltage 700V was being applied between the two electrodes, the paper was exposed to a light image through the transparent electrode. A colored image appeared on the surface of the insulating paper and a negative mirror image on the surface of transparent electrode.

The colored organic photoconductive materials of this invention can also be effectively employed as a component of the photosensitive layer for electrophotography.

Recently, colored copy papers are often used for duplicate purpose in offices dependently on the use or content of the duplicates. Since the colored organic photoconductive materials of this invention exhibit photoconductivity for themselves, they can be employed to prepare colored duplicate papers for electrophotography by applying them on a supporter, such as paper, either as they are or in a mixture with other photoconductive substances such as zinc oxide, polyvinylcarbazole and, if necessary, with an appropriate binding material.

The following examples illustrate the colored organic photoconductive materials as used to prepare the photosensitive layer for electrophotography.

EXAMPLE 16

To 10 parts of the colored organic photoconductive substance obtained in Example 1 were added 80 parts of dioxane, 60 parts of dimethylformamide, and 30 parts of methylcellosolve and further 28 parts of zinc oxide, and the whole mixture was treated for 4.0 – 4.5 hours with a ball mill to make a dispersoid.

On base papers of 60 – 70g weight per square meter which had been treated with polyvinyl alcohol, the zinc oxide paint above was applied with a roll and dried by hot air. The photosensitive papers thus prepared are colored magenta. The colored photosensitive paper for electrophotography prepared in this way was electrostatically charged with a corona discharger to which $-7KV$ was applied. Subsequently the paper was exposed to light together with the original figure and by the liquid developing process using a pigment-petroleum solvent a positive image was produced.

The colored organic photoconductive materials of this invention are especially suited, as the above examples show, to be used for photographic developer and photosensitive materials. In these cases, the materials of this invention can be naturally used not only alone but also in combination with various known additives or other materials. For example, one or more members selected from the group consisting of pigments, dyestuffs, resins, electrostatic charge controllers, dispersing agents and fixers may be dispersed or dissolved in the materials of this invention.

In the next place, examples of the reactions of organic photoconductive substance containing amino or hydroxyl group or groups with reactive color developing components containing active halogen atom or atoms will be shown.

EXAMPLE 17

To the substance (1.0 mol) of the formula (1) were added 3.0 liters of dioxane, 0.3 liter of methylene chloride and further 0.6 mol of a reactive coupler dissolved in 2.0 liters of dioxane. While the mixture being stirred at 10° – 15°C, 2 mols of sodium carbonate dissolved in 300ml of water was added at the same temperature. After stirring was continued for 5 – 6 hours, the mixture was poured into a large amount of water, when white crystals were precipitated which were then separated by filtration and washed with water. To the alcoholic alkali solution of the crystals, 50ml of a 2% solution of potassium ferricyanide and then 55ml of a 3% solution of dimethylparamine were added to obtain a magenta-colored matter. Filtration, thorough washing with water, and drying gave a photoconductive coloring material.

EXAMPLE 18

The precipitate formed in the aqueous solution in Example 17 was separated by filtration, washed with water, and dissolved in an alcoholic alkali solution to which solution was added a diazonium salt of aniline to obtain a yellow organic photoconductive coloring material.

EXAMPLE 19

The substance (1 mol) of the formula (4) was dissolved in a mixture consisting of 2.4 liters of dried benzene, 700ml of dried methylene chloride and dried pyridine. On the other hand, the substance (0.5 mol) of the formula (73) was dissolved in a mixture consisting of 1.5 liters of dried dioxane and 1.5 liters of dried benzene. Using these solutions, the treatment was followed as in Example 17 to obtain the reaction product, which was then treated in the same manner as in Example 18 to give a red organic photoconductive coloring material.

EXAMPLE 20

The substance (1.0 mol) of the formula (5) was dissolved in a mixture consisting of 3 liters of dried toluene and 4 mols of triethylamine, and on the other hand the substance (0.5 mol) of the formula (78) was dissolved in a mixture consisting of 2.5 liters of dioxane and 800ml of benzene. The latter solution was added to the former while the temperature was maintained at 0° – 5°C. Subsequently the temperature was raised to 90° – 95°C where the reaction was continued for 2 hours. The mixture was added to an ice-cooled hydrochloric acid and the precipitate formed was filtered, thoroughly washed with water and purified by recrystallization from dioxane. Further color developing reaction as in Example 17 produced a magenta-colored photoconductive coloring material.

EXAMPLE 21

The substance (1 mol) of the formula (7) was dissolved in a mixture consisting of 3 liters of dried dioxane and 4 mols of triethylamine, and on the other hand the substance (1 mol) of the formula (77) was dissolved in 4.0 liters of o-dichlorobenzene. Using the two solutions above the treatment was followed as in Example 20 and further the same color developing reaction as in Example 17 was conducted to obtain a blue photoconductive coloring material.

EXAMPLE 22

The substance (1 mol) of the formula (11) was dissolved in a mixture consisting of 3 liters of dried benzene and 4 mols of triethylamine and, on the other hand, the substance (0.5 mol) of the formula (79) was dissolved in a mixture consisting of 2 liters of nitrobenzene and 2 liters of dioxane. Using the two solutions, the same treatment as in Example 20 and further the same color developing reaction as in Example 17 were followed to obtain a blue photoconductive coloring material.

EXAMPLE 23

The substance (1 mol) of the formula (13) was dissolved in a mixture consisting of 500ml of dried ether, 2.5 liters of dried dioxane and 4 mols of dried triethylamine and, on the other hand, the substance (1 mol) of the formula (76) was dissolved in 4.0 liters of o-dichlorobenzene. The two solutions were mixed together and the same treatment as in Example 20 and further the same color developing reaction as in Example 17 were followed to obtain a yellow photoconductive coloring material.

EXAMPLE 24

To a solution of the substance (1.0 mol) of the formula (21) in 3.0 liters of chlorobenzene and further 310g of triethylamine maintained at 0° – 5°C, the substance (1.0 mol) of the formula (77) dissolved in 2.5 liters of dioxane was added under stirring at the same temperature 0° – 5°C. The same treatment as in Example 20 produced white powders which afforded a blue material when treated by the color developing reaction with diethylparamine as in Example 17 and a red material when treated with a diazonium salt of aniline.

EXAMPLE 25

To a solution of the substance (1.0 mol) of the formula (26) in 4.0 liters of dioxane and 320g of triethylamine cooled at 0° – 5°C, a solution of the substance (1.0 mol) of the formula (76) in 2.5 liters of dioxane was added and the mixture was treated as in Example 20 to obtain white powders of the melting point 210° –212°C. The powders developed yellow coloration when treated with either color developing agent of diethylparamine or diazonium salt.

The following examples show reactions of organic photoconductive substances containing active halogen atom or atoms with reactive color developing components containing amino or hydroxyl group or groups.

EXAMPLE 26

To a solution of the substance (1.0 mol) of the formula (80) in 3.0 liters of monochlorobenzene and 3.5 liters of dioxane, 350g of triethylamine was added under agitation and the mixture was cooled to 0° – 5°C. Subsequent addition of the substance (1.0 mol) of the formula (33) gave rise to an exothermic reaction. After addition of the total quantity, the mixture was heated to 90° – 95°C to continue the reaction for 90 min. After filtration and evaporation to a third of the volume at the reduced pressure, the remaining solution was added to methyl alcohol when a light-yellow solid substance appeared. Recrystallization from a mixed solution of dioxane and methylene chloride gave white powders, melting point 190° – 192°C. The same color developing reaction as in Example 17 produced a magenta-colored photoconductive substance.

EXAMPLE 27

To a solution of the substance (1.0 mol) of the formula (83) in 4.0 liters of dioxane, 320g of triethylamine was added. This was treated with the substance (1.0 mol) of the formula (32) in the same manner as in Example 26 gave white powders. The color developing reaction of the powders as in Example 17 afforded a photoconductive coloring material.

EXAMPLE 28

The substance (1.0 mol) of the formula (85) was dissolved in 5.0 liters of dioxane and 320g of triethylamine and cooled to 0° – 5°C. The substance (1.0 mol) of the formula (32) was added to it under agitation, and the mixture was treated as in Example 26 to give white powders. The color developing reaction with diethylparamine produced yellow coloration.

EXAMPLE 29

To a solution of the substance (1.0 mol) of the formula (84) in 5.0 liters of dioxane, 320g of triethylamine was added and the mixture was cooled at 0° – 5°C. Addition to it of the substance (1.0 mol) of the formula (32) under agitation and the same treatment as in Example 26 produced white powders. The color developing reaction with diethylparamine and a diazonium salt of aniline exhibited magenta and yellow coloration, respectively.

Examples will be shown below in which the color developing organic photoconductive materials of this invention were employed as developing materials for electrophotography.

EXAMPLE 30

The intermediate obtained prior to the color developing treatment described in Example 17, that is the reaction product of the substances of the formulae (1) and (72), was thoroughly washed with water and dried. The 5g portion of it was dispersed in 1000ml of a petroleum solvent (trade mark: Isopar) by treating with a ball mill for 5 hours, to prepare a developing solution. On the other hand, a photosensitive paper for electrophotography, which was prepared from zinc oxide and acrylic resin, was electrostatically charged with a corona discharger to which −7KV was applied, and this was exposed to light. The developing treatment with the above developer produced colorless figures at the charged parts. The paper was soaked in a color developing solution as in Example 17, when magenta-colored visible figures appeared. Alternatively, the colorless figures formed on the zinc oxide paper were transferred under pressure to a copying paper which had a slightly adhesive surface. The same color developing reaction as before produced magenta-colored visible figures.

EXAMPLE 31

The substance obtained prior to the color developing reaction in Example 21 was dispersed in Isopar in the same manner as in Example 30. Following the procedure in Example 30 colorless figures were formed on a zinc oxide paper, which were treated with a color developing agent either directly or after transferred to a copying paper as in Example 30 to form visible figures in which figures were colored blue.

EXAMPLE 32

The substance obtained prior to the color developing reaction in Example 23 was dispersed in Isopar in the same manner as in Example 30. Following the procedure in Example 30, colorless figures were formed on a zinc oxide paper, which were treated with a color developing agent either directly or after transferred to a copying paper as in Example 30 to form visible figures in which figures were colored yellow.

EXAMPLE 33

A photosensitive paper for electrophotography prepared from zinc oxide and acrylic resin was electrostatically charged with a corona discharger to which −7KV was applied. This paper was exposed to an original colored manuscript through a red filter when the electrical charge remains on the paper at those parts of the figures which should be colored blue. These parts were developed with the colorless developer described in Example 31 and the colorless figures were transferred, as in Example 30, by the electrostatic method to a copying paper having a slightly adhesive surface. Then the zinc oxide paper was exposed in the same way through a green filter, treated with a colorless developer described in Example 30 and the colorless figures were transferred to the same copying paper as above. Finally the zinc oxide paper was exposed through a blue filter, developed with the colorless developer described in Example 32 when only those parts of the figures which should be colored yellow were developed. These figures were similarly transferred to the above copying paper. Thus, the figures which should be colored blue, red and yellow were superimposedly obtained on a single paper. By the color developing reaction with dimethylparamine as conducted in Example 17, the figures were colored blue, red and yellow corresponding to the above treatments, giving the same colored figures as in the original manuscript.

EXAMPLE 34

The chemically combined colored substances appearing in Example 17 through 29 were separately pulverized with an atomizer into particles of the average diameter $5\mu$, of which 1 – 10g., preferably 2 – 5g, was thoroughly mixed with 100g of magnetic iron powder (as carrier) of the average particle diameter 100 – 150 mesh. The mixture was adsorbed on a bar magnet to be used as a magnetic brush. The electrostatically charged figures were converted into colored visible figures, when scanned above them several times with the brush. The colored figures could be made permanent figures by treating the known method of developing.

EXAMPLE 35

Each 10g of the chemically combined colored substances described in Examples 17 through 29 was dispersed with a ball mill in 100ml of such insulating liquid as kerosine and mineral spirit. The 10ml portion of it was further dispersed in 2ml of the same insulating liquid to obtain a liquid developer. The photosensitive paper for electrophotography carrying electrostatically charged figures on it was brought into contact with the developer by the method of soaking, rollers or spraying, when the electrostatically charged figures were developed into colored visible figures.

EXAMPLE 36

A photosensitive paper for electrophotography prepared from zinc oxide and acrylic resin was electrostatically charged with a corona discharger to which −7KV was applied. This paper was exposed to an original colored manuscript through a red filter, when the charge on the paper remains only at those parts of the figures which should be colored blue. These parts were developed with the blue developing solution obtained in Example 21 (the liquid developing agent prepared by dispersing a mixture of 100ml of a petroleum solvent and 1.5 – 2.0g of the toner with a ball mill for 15 – 20 hours) and fixed. The paper, after being dried, was again charged, exposed through a green filter and treated with the magenta developing solution (prepared as above from the toner obtained in Example 17) when only those parts were developed which were sensitive to the magenta developer. After fixing, the paper was again charged, exposed through a blue filter and treated with the developer (prepared as above from the toner obtained in Example 23) when only those parts were developed into figures which were sensitive to the yellow developer. The copied figures thus obtained almost reproduced the original manuscript.

The colored organic photoconductive materials of the present invention are not only used as toner materials in both dry and wet processes, but also suitable to the developing materials for figure formation in electrophoresis. The present method empolys a photoconductive pigment as toner instead of using a so-called photoconductive photosensitive layer.

The materials of this invention exhibit very excellent quality when used for the photoelectrophoretic imaging process. More particularly, the materials of this invention are very effective as photographic developing agent, especially for simultaneous reproduction of more than two colors.

The following examples show the use of the color developing organic photoconductive materials of this invention for the photographic developer employed in the figure formation of photoelectrophoretic imaging process.

EXAMPLE 37

The substance obtained in Example 17 was added to a petroleum solvent, Isopar-H (commercial name), in the amount of 12 – 15% by weight and dispersed by treating with a ball mill for 4 – 5 days to make a microdispersoid. This was applied on a light transparent electrode in a thin layer and an insulating paper was placed on it and then another electrode further on them. They were exposed to a light image while a DC voltage 700V, was being applied between the two electrodes. A colored image which corresponded to the light image was obtained on the insulating paper and a negative mirror image on the surface of the transparent electrode.

The color developing organic photoconductive materials of this invention can also be used effectively for a component of the photosensitive layer for electrophotography.

Recently colored copying papers are often preferred in offices to classify the copies more easily depending on use and purpose of the copies. Since the color developing photoconductive materials of this invention are photoconductive by themselves, they can be employed to make copying papers for electrophotography when applied on a supporting base such as paper, either alone or in combination with other photoconductive substance such as zinc oxide and polyvinyl carbazole and, if necessary, an appropriate combining material. In this case, the color developing treatment, when carried out, immediately produces colored copying papers.

The following examples show the use of the colored organic photoconductive materials of this invention for the photosensitive layers of electrophotography.

EXAMPLE 38

To 10 parts of the color developing organic photoconductive substance obtained in Example 17, 5 parts of copolymerized resin of styrene and butadiene, 80 parts of dioxane, 60 parts of dimethylformamide, 30 parts of methyl-cellosolve and 28 parts of zinc oxide were added. The mixture was treated with a ball mill for 4.0 – 4.5 hours. The zinc oxide paint thus prepared was then applied with a roller onto paper of 60 –70g weight per square meter to which polyvinyl alcohol had been applied to the surface, and the product was dried with hot air. The photosensitive paper thus obtained was colored in magenta color. This colored photosensitive paper for electrophotography was electrostatically charged with a corona discharger to which –7KV was applied, exposed to light together with a photographic manuscript, and treated with a liquid developer containing a pigment and a petroleum solvent to produce a positive figure.

The colored organic photoconductive substances of this invention are also characterized by producing different colors by being treated with different color developing agents. This fact is illustrated by the following examples.

EXAMPLE 39

The substance (1 mol) of the formula (1) was dissolved in 3 liters of dried benzene to which 700 ml of dried pyridine was then added. The mixture was thoroughly mixed by stirring and maintained at 0°– 5°C. On the other hand, the reactive coupler (0.6 mol) of the formula (72) was dissolved in 1 liter of dried benzene and 1.5 liters of dried dioxane. This solution was added in small increments to the former solution in such a way that the temperature did not rise above 10°C. After the total volume had been added, the temperature was gradually raised up to 90° – 95°C under agitation, after 2 hours allowed to cool and then poured into ice-cooled hydrochloric acid to make a slightly acid solution, when immediately the reaction product was precipitated. This was separated by filtration, thoroughly washed with water and dried.

A mixture consisting of 5g of the above product, 0.5g of linseed oil denatured alkyd resin, 0.5g of phenol denatured rosin and 10g of toluene was dispersed with a ball mill for 8 hours. The condensed solution (5g) thus prepared of the color developing colorless developer was dispersed in 1,000ml of a petroleum solvent, Isopar, to obtain the color developing colorless developer. This developer exhibited magenta color when treated with dimethylparamine or diethylparamine, and yellow color when treated with diazonium salt.

EXAMPLE 40

The reaction product obtained in Example 21 (the substance before submitted to the color developing reaction) was dispersed as in Example 39 together with alkyd or rosin and 5g of the concentrated color developing agent for photographic developer thus prepared was dispersed in 1,000ml of Isoper to obtain a color developing colorless developer. This agent developed blue and red colors when treated with dimethyl and diethylparamines, respectively.

EXAMPLE 41

A commercial zinc oxide copying paper was charged and exposed, as in Example 36, and developed with the colorless developer obtained in Example 39, and then with the developer for color developing in the same manner as in Example 17 to obtain magenta-colored figures.

EXAMPLE 42

A mixture consisting of 50g of the colorless photoconductive substance obtained in Example 17 (the substance before submitted to the color developing reaction), 8g of styrene resin and 10g of methyl acrylate ester resin was dissolved in 40g of methylethylketone and 30g of dimethylformamide. The resulting mixture was applied to 15 – 18 μ thickness to a high quality paper the surface of which had been processed with polyvinyl alcohol. The prepared photoconductive paper was electrostatically charged with a corona discharger to which –7KV was applied, and then exposed to light. On the other hand, 10g of titanium oxide and 20g of styrene resin was added to 50g of xylene and the mixture was dispersed for 8 hours with a ball mill, from which the resulting concentrated developing agent (10g) was dispersed in 2,000ml of Isopar as carrier. The white developer thus prepared was used to develop the above exposed photosensitive paper to obtain white figures. After complete melting of styrene resin and fixing, the color developing reaction was conducted as in Example 17 to develop magenta-colored figures in addition to white figures.

EXAMPLE 43

The color developing photoconductive substance (50g) obtained in Example 17 was mixed with 8g of polyvinyl butylate and 10g of acrylic acid-vinyl acetate (in the association ratio 1 : 1), and was dissolved in a mixture of 140g of methylethylketone and 130g of dimethylformamide. This was applied to 15 – 18μ thickness to a high quality paper the surface of which had been treated with oilyvinyl alcohol. The prepared photosensitive paper was electrostatically charged with a corona discharger, to which +7KV was applied, and exposed to light. The color developing substance (10g) prepared from the substances of the formula (7) and of the formula (77) was dissolved in 30g of polyvinyl butylate and the mixture was dispersed for 8 hours with a ball mill to obtain a concentrated developer. The 10g portion of the developer was dispersed in 2,000ml of Isopar, with which the above exposed paper was developed to obtain white figures. By being heated to 60°– 70°C and treated to develop colors in the same manner as in Example 17, the base of the photosensitive paper was colored in magenta color and the figures in cyan.

As is evident in the above examples, the color developing organic photoconductive materials of this invention are especially suitable to developing or photosensitive materials. Naturally the materials or this invention can be used not only alone, but in combination with various known additives or other materials. For example, one or more pigments, dyestuffs, resins, charge controllers, dispersers, fixers, sensitizers and desensitizers may be dispersed or dissolved in the materials of this invention.

What is claimed is:

1. In a toner for developing an electrostatic latent image, the improvement which comprises that the effective component of the toner is the reaction product obtained by condensing
   a. the organic photoconductive compound of the formula

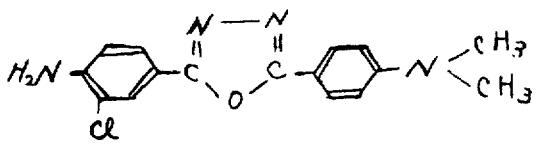

and
   b. the colored substance of the formula

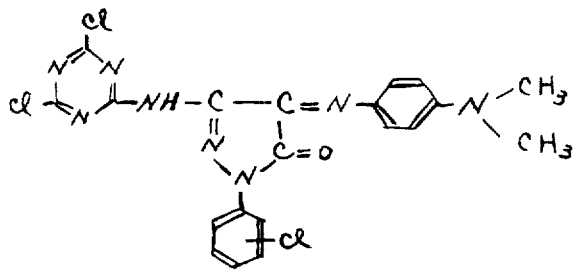

2. In a toner for developing an electrostatic latent image, the improvement which comprises that the effective component of the toner is the reaction product obtained by condensing
   a. an organic photoconductive compound being an oxydiazole compound and
   b. a colored substance being an azomethine pyrazolone dye.

3. In a toner for developing an electrostatic latent image, the improvement which comprises that the effective component of the toner is the reaction product obtained by condensing
   a. an organic photoconductive compound selected from the group consisting of oxydiazole compounds, oxazole compounds, thiazole compounds, imidazole compounds, carbazole compounds and polycarbazole compounds; and
   b. a colored substance selected from the group consisting of azomethine pyrazolone dyes, azo pyrazolone dyes, azo dyes, azomethine dyes and anthraquinone dyes.

* * * * *

UNITED STATES PATENT OFFICE
CERTIFICATE OF CORRECTION

Patent No. 3,933,664          Dated January 20, 1976

Inventor(s) Shinichiro Nagashima et al

It is certified that error appears in the above-identified patent and that said Letters Patent are hereby corrected as shown below:

In the heading of the Patent [30] should read as follows:

--[30] Foreign Application Priority Data

Dec. 30, 1968 Japan....................43-96504
May 12, 1969 Japan....................44-36431--.

Signed and Sealed this

Sixth Day of July 1976

[SEAL]

Attest:

RUTH C. MASON
Attesting Officer

C. MARSHALL DANN
Commissioner of Patents and Trademarks